Patented Dec. 22, 1953

2,663,723

UNITED STATES PATENT OFFICE 2,663,723

PROCESS FOR THE PREPARATION OF DIALKOXYTHIOPHOSPHORYL CHLORIDE

Marshall R. Bland, House Springs, and Evan J. Young, Valley Park, Mo., assignors to Monsanto Chemical Company, St. Louis, Mo., a corporation of Delaware No Drawing. Application May 20, 1950, Serial No. 163,321

13 Claims. (Cl. 260—461)

This invention relates to an improved process for the preparation of dialkoxythiophosphoryl chloride having the formula

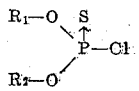

wherein $R_1$ and $R_2$ represent alkyl radicals containing at least 1 and not more than 8 carbon atoms.

Dialkoxythiophosphoryl chloride is an organic intermediate used in the preparation of O,O-dialkyl O-para-nitrophenyl thiophosphate esters, several of which esters have been found to have exceptional practical utility as insecticides. Heretofore, dialkoxythiophosphoryl chlorides have been prepared by reacting a one molecular proportion of thiophosphoryl chloride with approximately two molecular proportions of an alkali metal alkylate in an anhydrous alcoholic medium. In order to obtain satisfactory yields according to this process as heretofore used, it was essential that anhydrous conditions be maintained, as even small amounts of water significantly reduced the yield through the formation of hydrolysis products. The most commonly used method of preparing an anhydrous alcoholic solution of an alkali metal alkylate is by reacting a metallic alkali metal, such as sodium, with anhydrous alcohol. Because of the chemical nature of the pure alkali metals, the inflammable characteristics of the alcohols and the relatively high cost of the pure alkali metals, such a method of preparing an anhydrous alcoholic solution of an alkali metal alkylate is exceedingly dangerous and, at the same time, exceedingly costly.

It is an object of this invention, therefore, to provide an improved process for the preparation of dialkoxythiophosphoryl chloride.

It is a further object of this invention to provide an improved commercially feasible process for the preparation of dialkoxythiophosphoryl chloride whereby the hazards inherent in the process as heretofore used are eliminated and the cost significantly reduced.

Further objects will become apparent from a more particular description of the novel process of this invention.

It has now been discovered that in the preparation of dialkoxythiophosphoryl chloride from thiophosphoryl chloride, the deleterious effect of water is manifested most strongly during the introduction of the first alkoxy group, i. e., the formation of monoalkoxythiophosphoryl dichloride, and that during the formation of dialkoxythiophosphoryl chloride from alkoxythiophosphoryl dichloride, anhydrous conditions need not be maintained. Thus, it has been discovered that if, instead of attempting to introduce two alkoxy radicals into thiophosphoryl chloride in a single reaction step, the two alkoxy radicals are introduced one at a time as separate reaction steps, anhydrous conditions need be maintained only during the introduction of the first alkoxy radical. According to the novel process of this invention, therefore, alkoxythiophosphoryl dichloride is prepared according to any convenient method well known to those skilled in the art. The alkoxythiophosphoryl dichloride is then reacted with an alcoholic solution of an alkali metal hydroxide. Since this step of the reaction involves only the introduction of the second alkoxy group, minor amounts of water present in the alcoholic solution of the alkali metal hydroxide, due in part to the reaction of the alkali metal hydroxide and the alcohol to form an alkali metal alkylate and water, does not deleteriously affect the yield and quality of the dialkoxythiophosphoryl chloride.

The following examples are illustrative of the novel process of this invention:

Example I 84.7 g. of $PSCl_3$ were cooled to about 10° C. with continuous agitation in a glass lined closed reaction vessel. 24.1 g. of substantially anhydrous ethyl alcohol were added to the thiophosphoryl chloride with continuous stirring, while maintaining a temperature of approximately 10° C. After all of the ethyl alcohol had been added, the temperature was slowly increased to about 47° C. over a period of about 2 to 3 hours. During this time, the reaction mixture was placed under reduced pressure to facilitate the removal of the hydrogen chloride formed in the reaction.

To the ethoxythiophosphoryl dichloride thus obtained were added 216 g. of a 13% solution of sodium hydroxide in ethyl alcohol while maintaining a temperature of about 15° C. The reaction mixture was continuously agitated until the reaction was complete.

The reaction mixture thus obtained was quenched with water, the organic layer separated and substantially pure diethoxythiophosphoryl chloride separated therefrom by distillation under reduced pressure.

Diethoxythiophosphoryl chloride thus obtained in approximately an 80% yield, based on $PSCl_3$, was a clear, colorless liquid with a mild, pleasant odor, and having the following physical properties:

Boiling point _____ 79.5°–80° C./16 mm. Hg absolute.
$N_D^{25}$ _____ 1.4673.
Sp. Gr. at 25°/4° C. _____ 1.191.

*Example II*

0.5 mol of $PSCl_3$ was cooled to about 12° C. with continuous agitation in a glass lined closed reaction vessel. 0.5 mol of substantially anhydrous methyl alcohol was then added to the thiophosphoryl chloride with continuous stirring while maintaining a temperature below about 12° C. After all of the methyl alcohol had been added, the temperature was raised to about 30° C. over a period of several hours, at the same time placing the reaction mixture under a reduced pressure to remove the last traces of the hydrogen chloride formed in the reaction.

To the methoxythiophosphoryl dichloride thus obtained was added a 10% solution of sodium hydroxide in 95% methyl alcohol containing 0.7 mol of NaOH while maintaining a temperature of about 15° C. The reaction mixture was continuously agitated until the reaction was complete.

The reaction mixture thus obtained was quenched with water. The organic layer was distilled, recovering an excellent yield of substantially pure dimethoxythiophosphoryl chloride.

*Example III*

To one mol of $PSCl_3$ contained in a glass lined closed reaction vessel and cooled to about 15° C. was added one mol of sodium butylate contained as a 20% solution in anhydrous butyl alcohol. The reaction mixture was agitated for a period of about one hour, maintaining a temperature below 15° C.

To the alcoholic solution of butoxythiophosphoryl dichloride thus obtained was added 1.3 mols of sodium hydroxide as a 12% solution of NaOH in butyl alcohol while maintaining a temperature of about 15° C. The reaction mixture was agitated until the reaction was complete.

The reaction mixture thus obtained was washed with water and the organic layer separated. The organic layer was then fractionally distilled, removing the excess butyl alcohol and a substantially pure fraction of dibutoxythiophosphoryl chloride.

*Example IV*

0.5 mol of anhydrous n-hexyl alcohol was added with continuous agitation to 0.5 mol of $PSCl_3$ contained in a glass lined closed reaction vessel. During the addition of the reactants, the temperature was maintained below about 10° C. After all of the alcohol had been added to the $PSCl_3$, the temperature of the reaction mixture was slowly raised to about 40° C. and the hydrogen chloride formed during the reaction removed under reduced pressure.

To the hexoxythiophosphoryl dichloride thus obtained was then added 0.6 mol of potassium hydroxide in solution in n-hexyl alcohol. The reaction mixture was then agitated over a period of about two hours, maintaining a temperature of about 15° C.

The reaction mixture was then washed with water and the organic layer fractionally distilled recovering the excess n-hexyl alcohol and an excellent yield of substantially pure di-n-hexoxythiophosphoryl chloride was obtained.

*Example V*

To 1.0 mol of $PSCl_3$ contained in a closed glass-lined reaction vessel was added with continuous agitation 1.05 mols of sodium 2-ethylhexylate contained as approximately a 15% solution in anhydrous 2-ethylhexyl alcohol. During this reaction, the temperature was maintained at approximately 15° C.

When the reaction was complete, 1.1 mols of sodium hydroxide in solution in 2-ethylhexyl alcohol was added with continuous agitation and while maintaining a temperature below 15° C.

The reaction mixture thus obtained was then washed with water and the organic layer separated and fractionally distilled, recovering the excess 2-ethylhexyl alcohol and an excellent yield of di-2-ethylhexylthiophosphoryl chloride obtained.

*Example VI*

To 0.5 mol of $PSCl_3$ contained in a closed glass-lined reaction vessel and maintained at a temperature of about 10° C. was added 0.5 mol of anhydrous methyl alcohol. During the addition of the methyl alcohol, the temperature was maintained at about +10° C. and the reaction mixture continuously agitated. After all of the methyl alcohol had been added, the temperature of the reaction mixture was slowly raised to about 40° C. while removing the hydrogen chloride formed under reduced pressure.

To the methoxythiophosphoryl dichloride thus obtained was added 0.7 mol of sodium hydroxide contained as approximately a 13% solution in ethyl alcohol while maintaining a reaction temperature of about 10° C.

The reaction mixture thus obtained was then quenched with water and the organic layer distilled, thereby obtaining an excellent yield of substantially pure methoxyethoxythiophosphoryl chloride.

While the preceding examples illustrate specific embodiments of the novel process of this invention, substantial variations are possible in the reactants utilized, quantities of reactants and reaction conditions. For example, the quantity of the alcoholic solution of the alkali metal hydroxide utilized in the novel process of this invention may be varied over a substantial range. Since the alcohol generally serves a dual purpose in this reaction, namely, as the source of the alkoxy radical desired to be introduced into the alkoxythiophosphoryl dichloride molecule and as a reaction medium for the reaction, in excess of a one molecular proportion of the alkyl alcohol for each one molecular proportion of the alkoxythiophosphoryl dichloride is preferred. The amount of alcohol in excess of the one molecular proportion specified is not significant and is governed principally by the degree of fluidity desired in the reaction medium and any excess alcohol utilized is recovered in the purification step of the reaction. For somewhat similar reasons at least a one molecular proportion of the alkali metal hydroxide, and preferably from about 1.05 to about 1.5 molecular proportions of the alkali metal hydroxide for each molecular proportion of alkoxythiophosphoryl dichloride, should be present in the reaction medium in order to furnish at least a one molecular proportion of an alkali metal alkylate for each molecular proportion of the alkoxythiophosphoryl dichloride. A preferred embodiment of this invention, therefore, consists in reacting a one molecular proportion of an alkoxythiophosphoryl dichloride, wherein the alkyl substituent contains at least 1 and not more than 8 carbon atoms, with an alkyl alcohol solution of an alkali metal hydroxide containing in excess of a one molecular proportion of the alkali metal hydroxide and in excess of a one molecular proportion of the alkyl alcohol, said alkyl alcohol containing from 1 to 8 carbon atoms.

As previously pointed out, the presence of water during the addition of the second alkoxy radical in the formation of dialkoxythiophosphoryl chloride from thiophosphoryl chloride does not have the same significant deleterious effect as it does during the addition of the first alkoxy radical and the water present in the alcoholic solution of the alkali metal hydroxide formed by the reaction of the alkali metal hydroxide with the alkyl alcohol does not seriously affect the yield or quality of the final product. For similar reasons the alkyl alcohol utilized in preparing the alcoholic solution of the alkali metal hydroxide need not be anhydrous, as minor amounts of water in excess of that formed in the solution can be tolerated. The total quantity of water which can be present without deleteriously affecting the reaction is influenced by many variables, such as the concentration of the various reactants, temperature of reaction and time of reaction. The quantity of water that may be present in the reaction mixture should be insufficient to cause hydrolysis of the reaction products.

During the reaction between the alkoxythiophosphoryl dichloride and the above described alcoholic solution of an alkali metal hydroxide, the temperature may be varied over a wide range. Preferably, however, it is maintained within the range of from about −10° C. to about 25° C.

After the reaction between the alkoxythiophosphoryl dichloride and the alcoholic solution of the alkali metal hydroxide is complete, substantially pure dialkoxythiophosphoryl chloride may be recovered from the reaction mixture and purified in any manner well known to those skilled in the art. For example, the reaction mixture may be washed with water, the organic phase separated therefrom, and then distilled under reduced pressure, thereby obtaining substantially pure dialkoxythiophosphoryl chloride. When alcohols which are insoluble in water are utilized, the reaction mixture may be washed with water and the organic layer fractionally distilled, recovering as separate fractions the excess alcohol and substantially pure dialkoxythiophosphoryl chloride.

In many instances separation and purification of substantially pure dialkoxythiophosphoryl chloride may not be necessary. For example, a preferred method of preparing O,O-dialkyl-O-para-nitrophenyl thiophosphate consists in reacting dialkoxythiophosphoryl chloride with an alkali metal p-nitrophenate in an alcoholic medium. It is, therefore, evident that when dialkoxythiophosphoryl chloride prepared in accordance with the novel process of this invention is to be utilized in the preparation of O,O-dialkyl O-para-nitrophenyl thiophosphate, isolation and purification of the dialkoxythiophosphoryl chloride is not necessary as it is already contained in an alcoholic medium.

Alkoxythiophosphoryl dichloride may be obtained in any manner well known to those skilled in the art. For example, it may be prepared by reacting a one molecular proportion of thiophosphoryl chloride with approximately a one molecular proportion of an alkali metal alkylate in an anhydrous alcoholic medium, preferably at a temperature in the range of from about −10° C. to about +25° C. Since this manner of preparation necessitates the use of an anhydrous alcoholic solution of an alkali metal alkylate, which usually must be prepared by reacting an alkali metal with an anhydrous alcohol, this method of preparation is not too desirable, because of the previously mentioned hazards and costs in preparing such a material. A more preferred method of preparing alkoxythiophosphoryl dichloride consists in reacting a one molecular proportion of thiophosphoryl chloride with approximately a one molecular proportion of a substantially anhydrous alkyl alcohol containing at least 1 and not more than 8 carbon atoms, while maintaining a reaction temperature within the range of from about −10° to about +25° C., until the reaction between the alkyl alcohol and the thiophosphoryl chloride is substantially complete, and while removing the hydrogen chloride formed in the reaction, and thereafter continuing the removal of hydrogen chloride formed at a temperature not exceeding about 50° C. The hydrogen chloride formed may be removed in any convenient method, such as by blowing the reaction mixture with air or, and preferably, under reduced pressure. This reaction is substantially a quantitative reaction; hence, the alkoxythiophosphoryl dichloride thus prepared may be utilized without further purification in the preparation of dialkoxythiophosphoryl chloride.

Utilizing the latter mentioned method for preparing alkoxythiophosphoryl chloride in conjunction with this invention for the preparation of dialkoxythiophosphoryl chloride from alkoxythiophosphoryl dichloride as previously described, it is evident that the use of a metallic alkali metal in any part of the process is completely eliminated, thereby also eliminating all of the hazards and costs inherent in its use. It is also evident that even if the first mentioned process for preparing alkoxythiophosphoryl dichloride is utilized in conjunction with the novel process of this invention for preparing dialkoxythiophosphoryl chloride from alkoxythiophosphoryl dichloride, only half as much of the metallic alkali metal need be utilized as was heretofore utilized in the process described in the prior art. Consequently, preparing dialkoxythiophosphoryl chloride according to such a combination of reaction steps, also results in a significant reduction in the hazards connected with the use of an alkali metal in the preparation of an anhydrous alcoholic solution of an alkali metal alkylate.

What is claimed is:

1. In a process for the preparation of dialkoxythiophosphoryl chloride having the formula

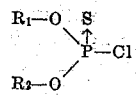

wherein $R_1$ and $R_2$ represent alkyl radicals containing from 1 to 8 carbon atoms, the step comprising reacting an alkoxythiophosphoryl dichloride, wherein the alkyl substituent contains from 1 to 8 carbon atoms, with an alkyl alcohol solution of an alkali metal hydroxide, said alkyl alcohol containing from 1 to 8 carbon atoms.

2. In a process for the preparation of dialkoxy- thiophosphoryl chloride having the formula

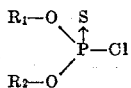

wherein $R_1$ and $R_2$ represent alkyl radicals containing from 1 to 8 carbon atoms, the step comprising reacting a one molecular proportion of an alkoxythiophosphoryl dichloride, wherein the alkyl substituent contains from 1 to 8 carbon atoms, with an alkyl alcohol solution of an alkali metal hydroxide containing at least a one molecular proportion of the alkyl alcohol and at least a one molecular proportion of the alkali metal hydroxide, and said alkyl alcohol containing from 1 to 8 carbon atoms.

3. In a process for the preparation of alkoxy- methoxythiophosphoryl chloride wherein the alkyl substituent contains from 1 to 8 carbon atoms, the step comprising reacting a one molecular proportion of an alkoxythiophosphoryl dichloride, wherein the alkyl substituent contains from 1 to 8 carbon atoms, with a methyl alcohol solution of an alkali metal hydroxide containing at least a one molecular proportion of methyl alcohol and at least a one molecular proportion of the alkali metal hydroxide.

4. In a process for the preparation of dimethoxythiophosphoryl chloride, the step comprising reacting a one molecular proportion of methoxythiophosphoryl dichloride with a methyl alcohol solution of an alkali metal hydroxide containing at least a one molecular proportion of methyl alcohol and at least a one molecular proportion of the alkali metal hydroxide.

5. The process as described in claim 4 wherein the alkali metal hydroxide is sodium hydroxide.

6. In a process for the preparation of alkoxy- methoxythiophosphoryl chloride wherein the alkyl substituent contains from 1 to 8 carbon atoms, the step comprising reacting a one molecular proportion of methoxythiophosphoryl dichloride with an alkyl alcohol solution of an alkali metal hydroxide containing at least a one molecular proportion of the alkali metal hydroxide and at least a one molecular proportion of the alkyl alcohol, said alkyl alcohol containing from 1 to 8 carbon atoms.

7. In a process for the preparation of alkoxy- ethoxythiophosphoryl chloride, wherein the alkyl substituent contains from 1 to 8 carbon atoms, the step comprising reacting a one molecular proportion of an alkoxythiophosphoryl dichloride, wherein the alkyl substituent contains from 1 to 8 carbon atoms, with an ethyl alcohol solution of an alkali metal hydroxide containing at least a one molecular proportion of the alkali metal hydroxide and at least a one molecular proportion of ethyl alcohol.

8. In a process for the preparation of alkoxy- ethoxythiophosphoryl chloride, wherein the alkyl substituent contains from 1 to 8 carbon atoms, the step comprising reacting a one molecular proportion of ethoxythiophosphoryl dichloride with an alkyl alcohol solution of an alkali metal hydroxide containing at least a one molecular proportion of the alkali metal hydroxide and at least a one molecular proportion of the alkyl alcohol, said alkyl alcohol containing from 1 to 8 carbon atoms.

9. In a process for the preparation of diethoxy- thiophosphoryl chloride, the step comprising reacting a one molecular proportion of ethoxythiophosphoryl dichloride with an ethyl alcohol solution of an alkali metal hydroxide containing at least a one molecular proportion of ethyl alcohol and at least a one molecular proportion of the alkali metal hydroxide.

10. The process as described in claim 9 wherein the alkali metal hydroxide is sodium hydroxide.

11. In a process for the preparation of methoxyethoxythiophosphoryl chloride, the step comprising reacting a one molecular proportion of ethoxythiophosphoryl dichloride with a methyl alcohol solution of an alkali metal hydroxide containing at least a one molecular proportion of methyl alcohol and at least a one molecular proportion of the alkali metal hydroxide.

12. In a process for the preparation of methoxyethoxythiophosphoryl chloride, the step comprising reacting a one molecular proportion of methoxythiophosphoryl dichloride with an ethyl alcohol solution of an alkali metal hydroxide containing at least a one molecular proportion of ethyl alcohol and at least a one molecular proportion of the alkali metal hydroxide.

13. In a process for the preparation of dialkoxy- thiophosphoryl chloride having the formula

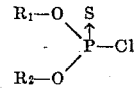

wherein $R_1$ and $R_2$ represent alkyl radicals containing from 1 to 8 carbon atoms, the steps comprising reacting a one molecular proportion of an alkoxythiophosphoryl dichloride wherein the alkyl substituent contains from 1 to 8 carbon atoms with an alkyl alcohol solution of an alkali metal hydroxide while maintaining a reaction temperature in the range of from about −10° C. to about +25° C., said alkyl alcohol solution of an alkali metal hydroxide containing at least a one molecular proportion of the alkali metal hydroxide and at least a one molecular proportion of an alkyl alcohol containing from 1 to 8 carbon atoms.

MARSHALL R. BLAND.
EVAN J. YOUNG.

References Cited in the file of this patent

UNITED STATES PATENTS

| Number | Name | Date |
|---|---|---|
| 2,005,619 | Graves | June 18, 1935 |
| 2,503,390 | Jelinek | Apr. 11, 1950 |
| 2,504,121 | Gamrath | Apr. 18, 1950 |

OTHER REFERENCES

Scrader, British Intelligence Objectives Report No. 1808. Released October 4, 1948, pages 7 and 8.

Mastin et al., J. Am. Chem. Soc., vol. 67, pages 1662–1664 (1945).